INVENTORS
BRIAN O'BRIEN JR.
BRIAN O'BRIEN
ATTORNEYS

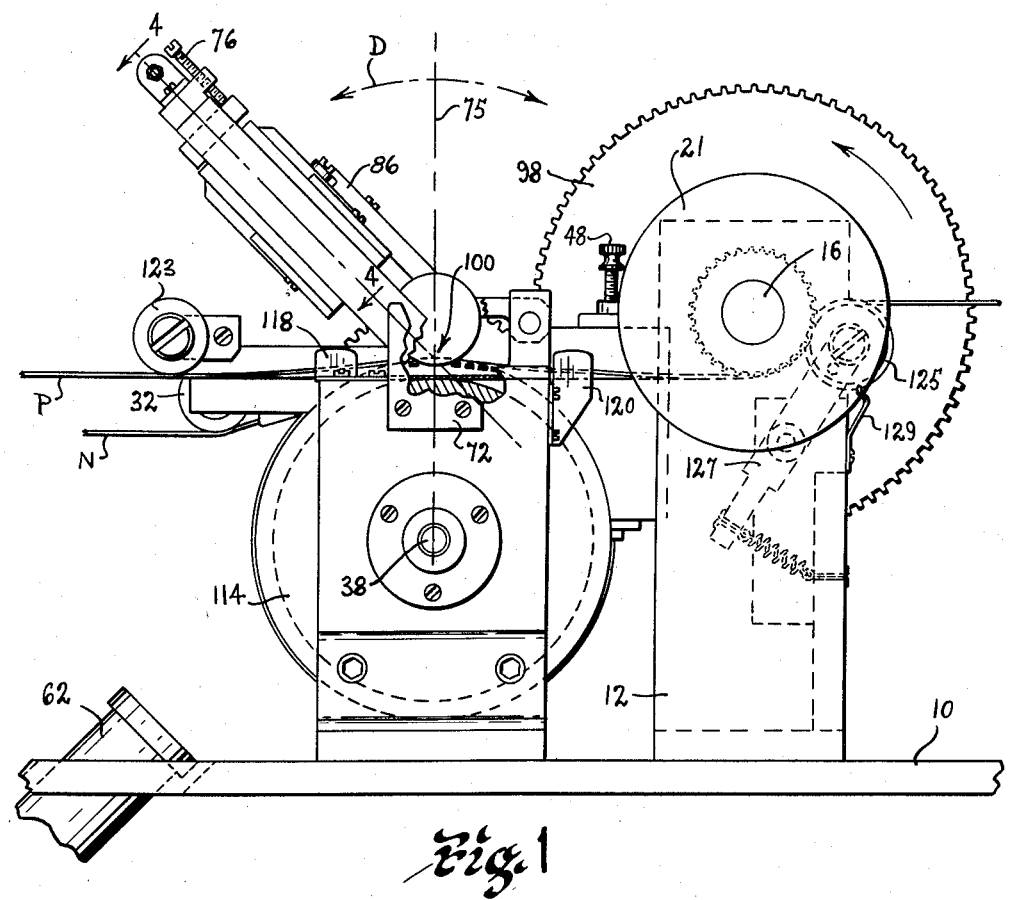
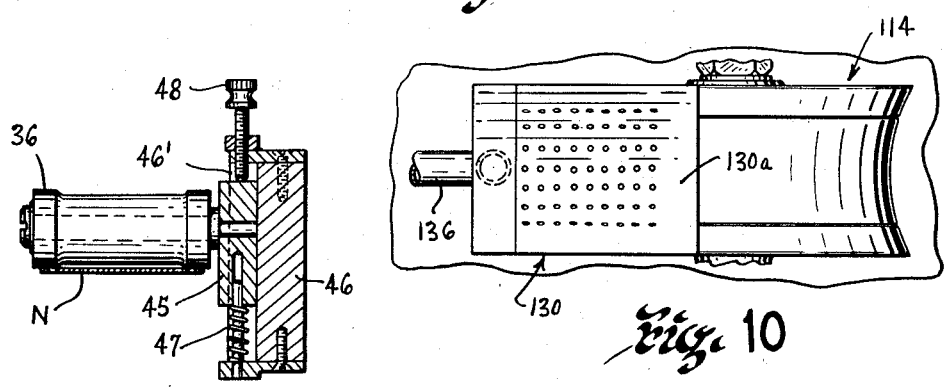

INVENTORS
BRIAN O'BRIEN JR.
BRIAN O'BRIEN
BY Louis L. Gagnon
Noble D. Williams
ATTORNEYS Jan. 13, 1959

B. O'BRIEN, JR., ET AL 2,868,070

OPTICAL PRINTING APPARATUS

Filed Oct. 18, 1954

INVENTORS
BRIAN O'BRIEN JR.
BRIAN O'BRIEN
BY Louis L. Gagnon
Noble J. Williams
ATTORNEYS

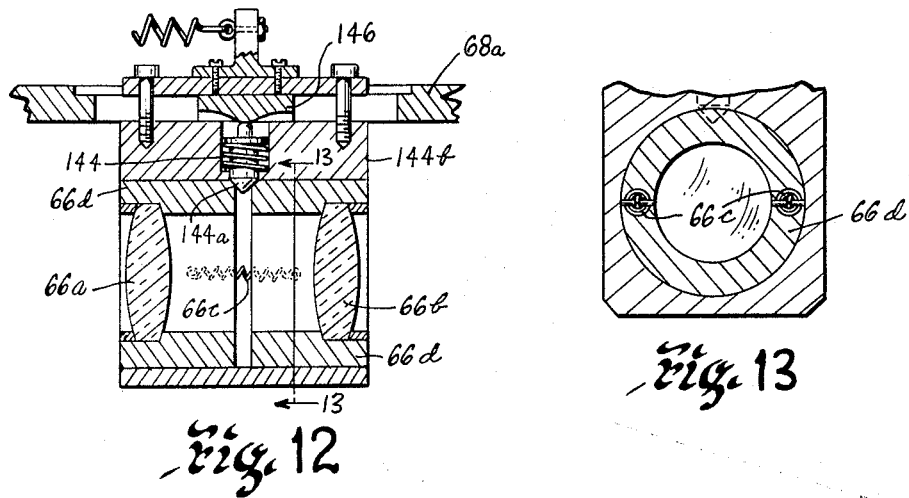
Fig. 12
Fig. 13
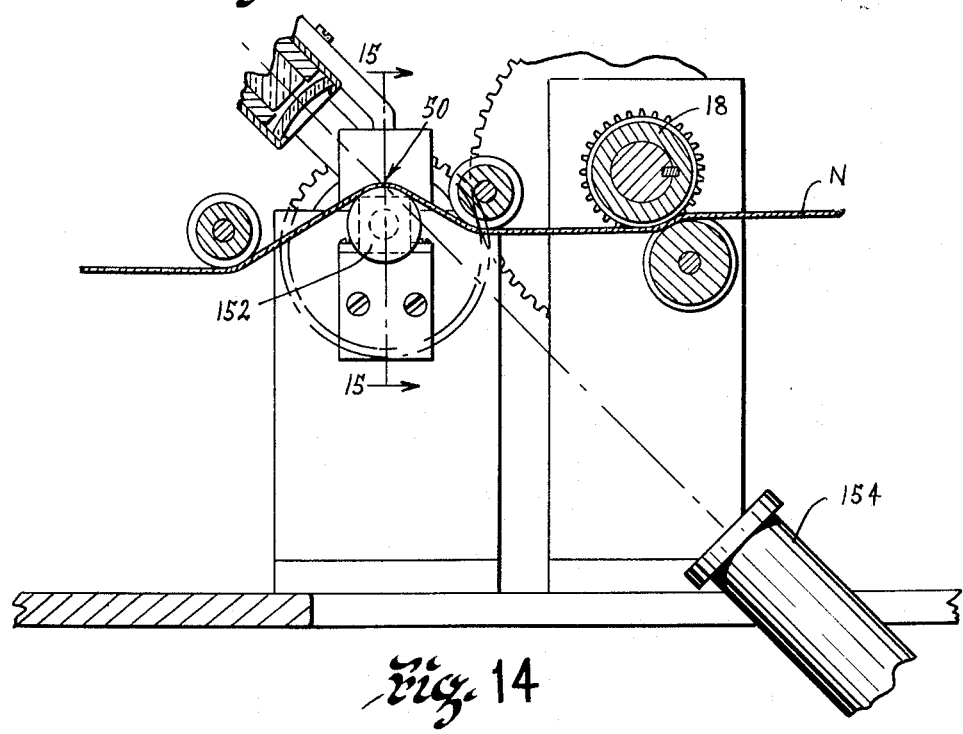
Fig. 14

INVENTORS
BRIAN O'BRIEN JR
BRIAN O'BRIEN

INVENTORS
BRIAN O'BRIEN JR.
BRIAN O'BRIEN
BY
ATTORNEYS

United States Patent Office 2,868,070
Patented Jan. 13, 1959

2,868,070

OPTICAL PRINTING APPARATUS

Brian O'Brien, Jr., and Brian O'Brien, Pomfret, Conn., assignors to American Optical Company, Southbridge, Mass., a voluntary association of Massachusetts Application October 18, 1954, Serial No. 462,717

16 Claims. (Cl. 88—24)

This invention relates to photographic printing apparatus and more particularly to projection printing apparatus employing means for supporting a continuously moving image-carrying strip film, means for supporting a second continuously moving strip film in position in said apparatus during exposure thereof, and means for transferring an image from the first film to the second film and means for introducing into the image during transfer thereof distortion of predetermined character and of a predetermined amount.

In copending application, Serial No. 346,953, filed April 6, 1953, there is disclosed a combined photographic and projection optical system by which wide angle pictures with carefully controlled amounts of distortion are photographically obtained and subsequently projected onto a horizontally curved wide field projection screen of predetermined shape so that the resulting picture image thereon may be observed with a relatively high degree of freedom from distortion from an audience position before the screen notwithstanding the amount of distortion initially introduced into the picture while the picture was being taken. While a comparatively high degree of this introduced distortion is removed during the subsequent projection of the picture when using such a system, there may remain near the outer corners of the picture slight amounts of distortion which, while under normal conditions might not be noticeable to a casual observer, nevertheless at other times and under certain conditions such distortion may be observed. In fact, this is particularly true when elongated vertically extending objects appear in the side edge portions of the screen image.

For this reason, it may be desirable to introduce into the images upon the film to be projected onto such a widely curved screen a predetermined amount of image distortion or image rectification of a carefully controlled type during the projection printing of the positive or release film from the original or negative film with the introduced distortion being effected in such a manner that upper and lower outer corner portions of the film will be slightly extended or displaced outwardly and upwardly, as compared to the uncorrected screen image, with the result that the projected image upon the viewing screen will appear to be substantially free from distortion.

The apparatus of the present invention is provided with suitable means for introducing controlled amounts of distortion or rectification of a proper sign and amount into parts of each successive film frame being printed or recopied during the continuous travel of the positive and negative strip films through the printing apparatus of the present invention.

It will also be appreciated from the description which follows that when wide generally rectangular pictures of the type disclosed in said copending application, for example, are projected upon a curved viewing screen from a position displaced above a normal extending forwardly from the center of the screen, a consequent distortion, which for convenience hereinafter will be referred to as "droop" or "sag," will be introduced into the picture upon the viewing screen and the center will appear too low, unless proper steps are taken to care for such image distortion. If the projection position is below the normal, as might be the case in a "drive-in" theater the distortion might be in the opposite direction, and the side edges instead of the center might appear to "droop" or "sag."

The apparatus of the present invention, accordingly, has been additionally provided with means whereby a compensating amount of "droop" or "sag" distortion may be introduced into the film image being printed on the positive film during the continuous strip printing operation and this may be accomplished simultaneously with the image rectification mentioned above. The apparatus of the present invention, in fact, functions in projection printing of the positive film in such a manner that the final image projected upon the viewing screen will appear to persons in the audience area and observing the picture to be substantially free from distortion.

It is accordingly an object of the present invention to provide projection printing apparatus for supporting and continuously simultaneously moving a first and a second strip film during image transfer from one to the other and means for introducing into the image being so transferred controlled amounts of distortion for selected parts of said image.

It is also an object to provide continuous strip film projection printing apparatus of the character described having means therein by which film images having controlled amounts of introduced distortion in predetermined side edge parts thereof may be reproduced or copied while having a preselected amount of compensating distortion or rectification introduced therein so that the final image upon an associated screen will appear nearly free from distortion.

It is another object of the present invention to provide in continuous strip film projection printing apparatus means whereby predetermined amounts of image distortion of the proper type may be introduced into the film image being transferred or copied therein so that a desired amount of compensating "droop" or "sag" will be provided in parts of each individual transferred frame image, whereby subsequent projection of the individual frame images from an elevated or depressed position onto a viewing screen of predetermined curvature may be had with apparent freedom from distortion for individuals viewing the screen from an audience area in front of said screen.

It is an object of the invention to provide in apparatus of the character described means by which controlled amounts of "keystone" compensation may be introduced, when desired, into the film images being copied in such a manner as to function co-operatively with said compensating droop also being simultaneously introduced for providing apparent freedom from distortion to persons viewing the projected images.

It is a further object of the present invention to provide continuous strip projection printing apparatus of the character described having means whereby "lateral" or "side edge" rectification, "droop" distortion and "keystone" distortion compensations predetermined controlled amounts may be introduced simultaneously into each film image being copied in said projection printer.

It is an additional object to provide projection printing apparatus of the character described which operates in a continuous and comparatively rapid manner for copying or transferring film images from one film to another with controlled amounts of side edge rectification and droop being introduced simultaneously therein and with a comparatively high degree of image resolution being provided in all parts of each film frame being printed thereby.

Other objects and advantages of the invention will become apparent from a detailed description which follows when taken in conjunction with the accompanying drawings, in which:

Fig. 1 is a side elevational view of continuous strip film projection printer embodying a preferred form of the present invention;

Fig. 6 is a fragmentary sectional view taken substantially upon section line 6—6 of Fig. 2;

Fig. 10 is a fragmentary plan view of the structure of Fig. 9;

Fig. 12 is a fragmentary sectional view of a modification of another part of the apparatus of Fig. 1;

Fig. 13 is a sectional view taken substantially upon section line 13—13 of Fig. 12 and looking in the direction of the arrows;

Fig. 14 is a fragmentary vertical sectional view of a modification of another part of the apparatus of Fig. 1;

Figure 2:
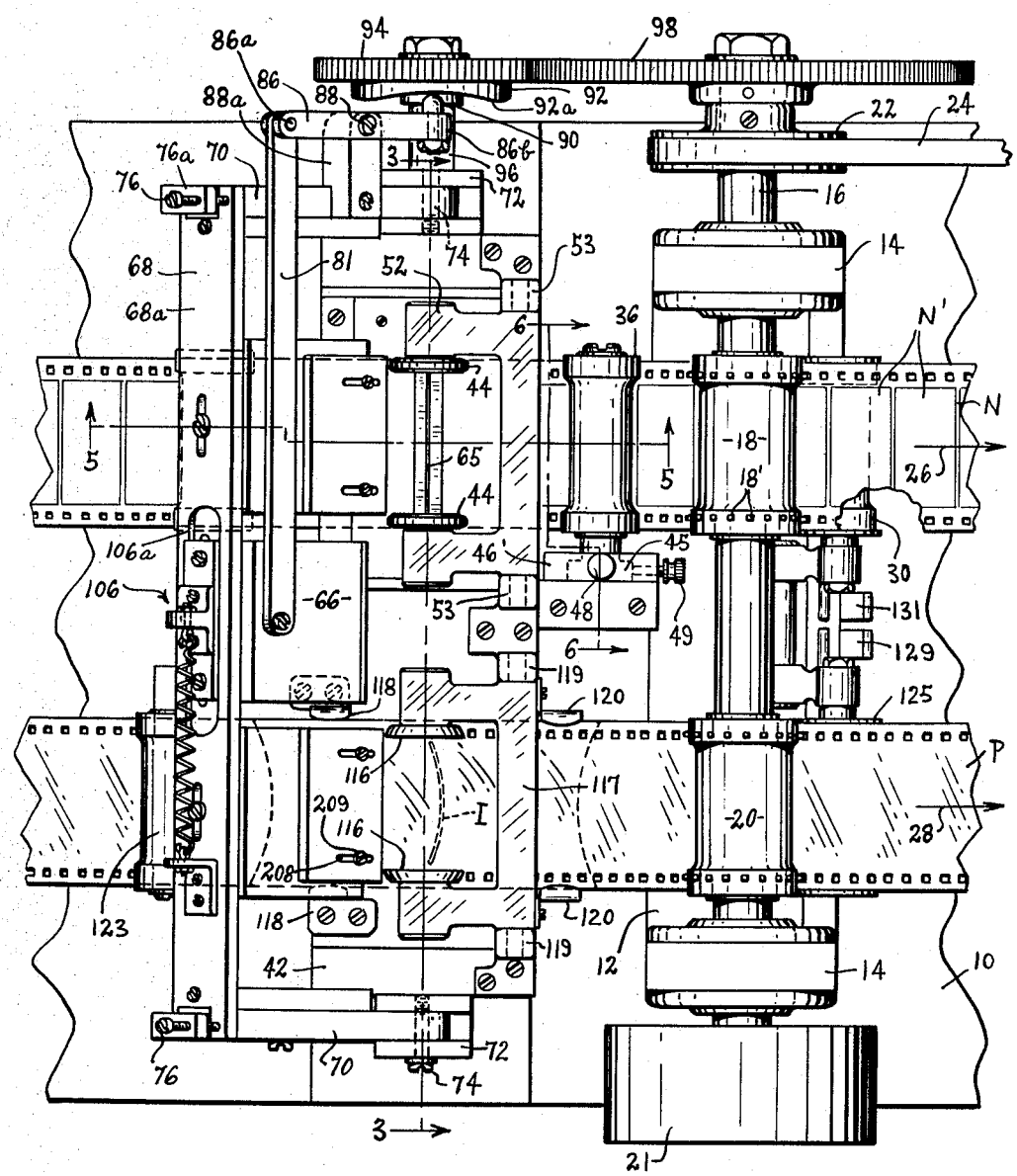
Fig. 2 is a plan view of the apparatus of Fig. 1.

Referring to the drawings in detail and particularly Figs. 1 and 2, it will be seen that the printing apparatus of the present invention comprises a supporting base 10 having an upstanding U-shaped frame 12 secured thereto and each upstanding arm portion 13 of this frame is in turn provided with a bearing 14 adjacent its upper end for rotatably receiving a drive shaft 16 carrying a pair of film-driving sprockets 18 and 20 secured thereto. The shaft 16 is provided with a pulley 22 for accommodating a V-belt 24 which will be normally driven by a conventional electric motor (not shown) at a preselected speed.

The sprocket 18 is arranged to engage and continuously move a first or negative strip film N through the apparatus in a direction indicated by the arrow 26. Simultaneously, the sprocket 20 operates to move a second or positive film P to be exposed through the printing apparatus in a generally parallel direction as indicated by the arrow 28. The first film N having thereon a series of frames of photographic images, indicated by N', is maintained in engagement with the sprocket 18 by means of the spaced flanges of a pressure roller 30 engaging the underside of the film adjacent opposite side edges thereof and yieldably holding the film partially curved about the lower side of the sprocket 18 and the perforations therein in engagement with the sprocket teeth 18'.

Figure 3:
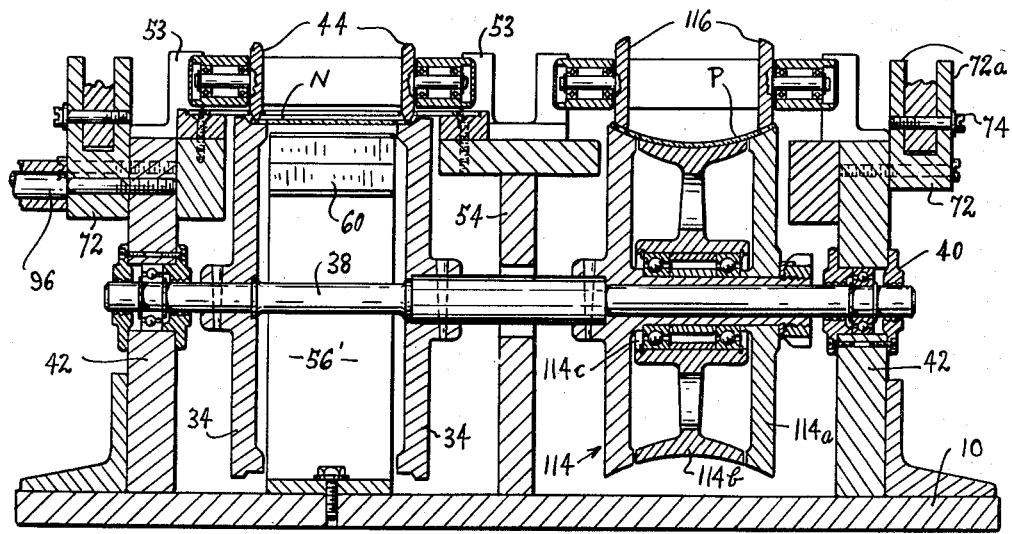
Fig. 3 is a transverse sectional view of the apparatus taken substantially upon section line 3—3 of Fig. 2 and looking in the direction of the arrows.
Figure 5:
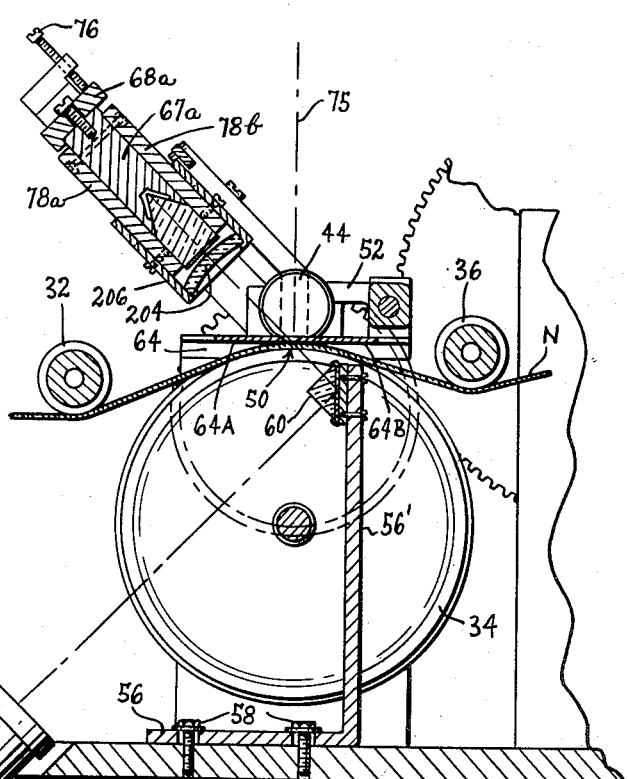
Fig. 5 is a fragmentary vertical sectional view taken substantially upon section line 5—5 of Fig. 2.

The film N being drawn through the printing apparatus by the sprocket wheel 18 is caused, as best shown in Figs. 3 and 5, to pass arcuately over a pair of large spaced flanged wheels 34 and is held in this arcuate position by a centrally recessed guide roller 32 in front of the wheels 34 and by another similar guide roller 36 located rearwardly of wheels 34 and between these wheels and the sprocket wheel 18. The guide wheels 34 are supported by and pinned to a free running shaft 38 having its opposite ends rotatably supported by antifriction bearing means 40 carried by upstanding frame members 42 welded, bolted or otherwise secured to the base 10. A pair of spaced pressure rollers 44 are operatively positioned directly above the center of the spaced flanged wheels 34 and serve co-operatively therewith to continuously hold the opposite side edge portions of the first or negative film strip N in exact positions. Accordingly this edge gripping of the film together with the arcuate shaping thereof over the wheels 34 maintains the intermediate transverse section of the film in an exact location relative to a fixed illumination position, indicated by the arrow 50, for purposes to be presently described.

The spaced pressure rollers 44 are secured to individual stub shafts antifrictionally journaled in the ends of a U-shaped yoke 52 which is in turn pivotally carried by a pair of brackets 53 one of which is mounted upon the upper end of one frame member 42 and the other of which is carried upon a central supporting member 54 secured to the base 10 and extending upwardly therefrom. The previously mentioned guide roller 36 has its supporting shaft (see Fig. 6) carried by a guide block 45 which is slidably mounted between a pair of spaced vertical guideways 46'. The guide block 45 is provided with vertically opposed compression spring means 47 and an adjustment screw 48 so that the roller may be conveniently moved downwardly against spring pressure into a proper position to arcuately shape the film N and thereafter the block may be locked in position by a set screw 49 threaded into one guideway and engaging a side of the block 45. The guideways 46' are carried by a mounting block 46 and this block may be fixedly secured to central supporting member 54 or other suitable fixed part of the apparatus.

Between the wheels 34 is an angled support 56 adjustably secured by slot and bolt means 58 to the base 10. Thus the support is arranged for slight longitudinal adjustment. The upwardly extending arm portion 56' of this support is arranged to carry a relatively wide reflecting prism 60 so that a beam of light being projected upwardly from an illumination means 62 carried adjacent the base 10 may be directed toward the illumination position 50. Any illumination means which will direct and focus a relatively wide uniformly concentrated beam at the position 50 will be satisfactory. A slit-forming mechanism is provided above the film N and adjacent the illumination position 50 and comprises a pair of adjustable blades 64A and 64B forming a parallel sided slit 65 of variable width therebetween. Thus only a part of the light impinging upon the film N at the position 50 will pass through the adjacent slit 65.

An image forming optical system including an objective 66 and a pair of reflecting prisms 67 and 69 is carried by a transversely extending inverted U-shaped yoke 68 which has its opposite downwardly extending arms 70 pivotally mounted in bifurcated brackets 72. The brackets 72 are in turn supported upon the upper ends of the upstanding supports 42 with the pivot means 74 for the yoke 68 transversely aligned with the illumination position 50. The reason for this arrangement is that at different times and according to different theater requirements for which the film being copied by the apparatus is intended, it will be desirable to adjust the yoke 68 different amounts about the axis of the pivot means 74. Or stated differently, the yoke may thus be adjusted to have different amounts of angular displacement relative to a vertical transverse plane 75 passing through the illumination position 50 and in a direction indicated by the arrow D. The reasons for this adjustment will be more fully later described. When a desired angular adjustment of the yoke 68 has been obtained, the pivot means 74 may be tightened to clamp the forked ends 72a of the bifurcated brackets 72 upon the arms 70 of the yoke.

The side arms 70 of the yoke 68 are extensible (see Fig. 4) and this is accomplished by forming each arm of two slidably adjustable elements 70a and 70b which may be clamped in any adjusted position by a securing bolt 70c. Micrometer adjustment of these slidable elements may be obtained by adjustment screws 76 carried by fixed blocks 76a upon the upper ends of elements 70a at opposite ends of the yoke. The adjustment screws 76 extending downwardly therethrough have engagement with the top surface of the crossbar 68a of the yoke and thus limit how far out the crossbar carrying the optical system may be moved. Of course, the slot and bolt clamping means 70c at opposite sides of the yoke would not be firmly secured until after proper adjustment of both ends of the yoke for focusing purposes had been accomplished. The adjustment of the yoke 68 by movement between the slidable end parts 70a and 70b allows a proper objects-to-image distance to be obtained for the objective.

The swingable yoke 68 (see Fig. 4) supports the copying objective 66 centrally thereof and at opposite sides of the objective and in alignment therewith are the previously mentioned pair of reflecting prisms 67 and 69, the former receiving light passing through slit 65 and coming from the film N at the illumination position 50 and directing this light into the objective. The light passing through the objective 66 is received by the second prism 69 and is directed thereby downwardly toward the previously mentioned second or positive film P so as to strike same substantially at an exposure or copying location indicated in Fig. 1 by the arrow 100. As is well known a copying objective will invert the image and accordingly in the optical arrangement employed herein in which both films are traveling in the same direction in order to have the image being copied upon the second film P oriented in a manner like that of the original, the prism 67 is in the form of an inverting or roof prism. Adjustment means of known form is provided for aligning each prism upon its supporting means 67a and 69a, and each supporting means may be adjusted transversely upon the crossbar 68a by adjustment means 67b and 69b extending through slotted openings therein for proper alignment of each prism, respectively, with the first film N and the second film P.

As stated previously, the printing apparatus is provided with means for effecting a side edge rectification and keystone compensation, if desired, in the images being reproduced upon the second film P. To accomplish this, the objective 68 may be moved somewhat transversely along optical axis A from its mean focused position by means of a driving mechanism (see Figs. 1, 2 and 4) comprising a transversely extending link 81 connected to the objective and at 86a to a downwardly extending lever 86. The lever 86 is arranged to pivot about axis-forming means 88 carried upon a stub bracket 88a fixedly secured to one of said side arm members 70a of the swingable yoke. The lever 86 is arranged in such a manner that its lower free end portion 86b carrying a cam follower 90 is axially aligned with the previously mentioned pivot means 74 for yoke 68. Thus the cam follower 90 may engage a cam surface 92a on a side of a rotatable cam 92 which is fixedly carried upon and concentric with a gear 94 rotatably mounted upon a stub shaft 96. The stub shaft (see Fig. 3) is fixedly secured through one of the brackets 72 to the adjacent upstanding support 42 at a location directly below the contact point of the follower 90 with the cam. Gear 94 is arranged in meshing relation with a driving gear 98 carried upon the drive shaft 16 for the sprocket wheels 18 and 20 and the gear ratio between these two gears is so chosen that one half revolution of the cam gear 94 will be provided each time the driving gear 98 has moved through an angular amount sufficient to advance each strip film the length of one film frame. Cam 92 and gear 94 may be readily removed and replaced by a different cam and gear when a different movement or travel of the objective is desired.

Thus since the cam 92 has a pair of "high points" diametrically positioned thereon and at 90° thereto a pair of "low points" and since the contour shape for the cam surface therebetween is carefully controlled in accordance with the image distortion to be compensated for, the objective 66 may be moved back and forth transversely simultaneously with the movement of a film frame N' past the slit 65. This slight back and forth movement of the objective will produce a change in magnification of the slit image being formed by the objective 66. Therefore if the first film N and the second film P are moved simultaneously with movement of the objective, for example from a high starting point on the cam 92, to a low position thereon and then returned to the high starting position, while a film frame N' in being moved completely across the slit 65 a single frame on the second film P will be copied at the copying location indicated at 100 but the transverse dimensions of different parts of this copied frame will be altered.

Figure 7:
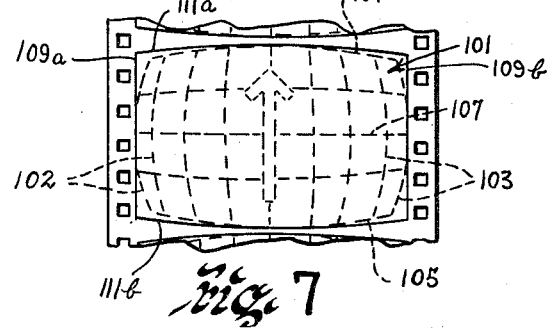
Fig. 7 is a view of a portion of strip film having a photographic image thereon which has been modified to provide side edge rectification thereof.

A condition which may be advantageously obtained by such an arrangement of back and forth movement of the objective 66 during simultaneous uniform movement of the films N and P, is illustrated in Fig. 7. If distortion containing photographic images of the type described in said copending application Serial No. 346,953 were provided upon the film N and if the photographed object were a grill-like figure of adjacent equal size dotted line squares (and with an arrow at the center), the image would look much like the dotted figure 101 in Fig. 7. Furthermore, if the objective 66 were allowed to remain stationary and this image copied onto film P it would continue to have substantially the same shape. It must be noted, however, that the outermost side lines 102 and 103 are noticeably curved and the printing apparatus of the present invention enables a straightening up or rectification of such lines without loss of the desired introduced distortion in other parts of the image, such as that contained along the transverse and vertical center lines of this grill-like figure, and this is accomplished while the films N and P move at a selected uniform speed through the printing apparatus. The arrangement of the apparatus is such that during each traverse of a film frame N' and a corresponding traverse of a film frame P' across the slit 65 and copying position 100, respectively, the upper and lower edge portions of a film image being copied (such as indicated at 104 and 105 in Fig. 7), will be increased in length relative to the transverse center line 107 thereof. This is because of the movement of the objective 66 and change in magnification produced thereby, and this change in length is such as to provide a straightening up of the side edges, such as indicated by solid lines 109a, 109b, 111a and 111b which are intended to indicate the positions which the outer edges of the image will occupy after the side edge rectification of image referred to previously. Also note that side lines 102 and 103 are lengthened slightly since the change in magnification just mentioned acts radially. For clarity in Fig. 7 only the positions 109a, 109b, 111a and 111b to be occupied by the outermost dotted lines of the image as printed on film P have been shown but of course it will be appreciated that other lines nearer the center will be rectified too, but in proportionately lesser degrees.

Or the apparatus may be arranged so that a decrease in transverse center line dimension of each film frame P' may be obtained relative to the dimensions of the upper and lower edges thereof to obtain, in a converse manner, equivalent side edge rectification or straightening of image. Since these two alternative arrangements of side edge image rectification are possible, it also follows that the apparatus may as readily be arranged to provide a combined action, wherein an increase in the length of the upper and lower edges and a decrease in length of the transverse center line of each frame is simultaneously obtained. Equivalent image correcting results will be obtained by each method but in different ways, the difference being that in the first instance the corners of the image will be "pushed out," in the second the center of the sides of the image will be "pulled in" and in the third a combined effect of "pushing out" the corners and "pulling in" the center of the sides will be produced. In the combined method one advantage will result from the fact that the desired compensation may be obtained by a shorter stroke or travel of the objective 66. Another and even more important advantage to be obtained by using this combined method will result from the fact that the objective may be worked at a mean magnification of one to one and under such conditions the focal tolerance for a given objective aperture is greater than for any other pair of conjugates. Also slight departures from this mean position have far less effect on focal tolerance than for conditions wherein the conjugate distances differ by greater amounts.

Longitudinal or axial travel of the objective 66 may be provided by a sliding connection 106 (see Figs. 2 and 4) comprising a shallow transversely disposed slot 106a in the top of the bar 68a and a slidable plate or member 106b arranged to fit therein, and this member 106b carries a pair of bolts 106c extending downwardly through a pair of smaller aligned transversely disposed slots 106d and having threaded engagement with an upper part 66a of a housing for the objective 66. A bracket 108 is secured to the top of the slidable plate 106b and anchors one end of a coiled tension or return spring 110 which has its opposite end anchored at 112 to a bracket carried by the cross member 68a. The purpose for this spring is to maintain the cam follower 90 at all times in operative engagement with the cam surface 92.

It has already been pointed out that the sprocket wheel 20 functions to draw the sensitized film P through the printer in the direction indicated by the arrow 28 and at a uniform speed. In order that the "droop" effect, referred to previously, may be provided in film images being formed upon this second film P, a large concavely contoured compound wheel or roller is provided at 114 upon the free running cross-shaft 38 and this wheel is located so that the top of the concave surface thereof will be disposed substantially at the copying position 100. Adjacent this location 100, a pair of frusto-conically shaped pressure rollers 116 are provided and arranged to engage the upper side edge portions of the strip film P for holding the film concavely against the wheel 114. These rollers 116 are carried upon the free ends of a U-shaped frame 117 pivoted in brackets 119 carried by supports 42 and 54. Additional film engaging means in the form of a pair of side guides 118 and a second pair of side guides 120 are provided fore and aft, respectively, of the concaved wheel 114 and copying location 100 so that jointly a concaving of the film at the copying location 100 will be constantly provided.

A flanged guide roller 123 suitably carried by means attached to the base is employed for initially positioning the film P entering the apparatus. A spring pressed roller 125 serves to engage the underside of the film as it leaves the sprocket wheels 20 and holds the film in engagement with the sprocket teeth thereof. This roller 125 is carried by a spring urged pivoted arm 127 attached to a fixed part of the device and has means thereon for engaging a spring clip 129 for retaining the roller 125 in an inoperative position when the second film P is being initially threaded through the apparatus. A like clip 131 is provided (see Fig. 2) for the spring pressed roller 30 for the first film N.

Thus it should be apparent that if the U-shaped swingable yoke 68 is located in a vertical position the image of the slit 65 being provided upon the transversely concavely curved film P at the copying location 100 will be merely a narrow straight line transversely of the film. On the other hand, if the swingable yoke 68 is adjustable to one side (or the other) of the vertical transverse plane 75, as indicated by the dotted double arrow D in Fig. 1, this slit image at the copying location 100 can be caused to impinge upon the film P along an arcuate path as indicated in Fig. 2 by the curved dotted lines I.

The amount of curvature provided the slit image at I, which will depend upon the amount and type of droop or sag desired in the copied film image P', may be increased or decreased by the degree of angular adjustment of the yoke 68. Therefore when a film is to be used in a theater arrangement having an appreciable angle of declination or inclination, as the case may be, for the projection beam so that the projection beam strikes the curved viewing screen, for example of the type described in said application Ser. No. 346,953, at an appreciable angle relative to a normal from the center of the screen a large predetermined amount of droop will be desirable in the copied image. Accordingly the yoke 68 will be adjusted to compensate for such an angle of tilt. In theaters having a lesser angle of tilt (declination or inclination) a lesser predetermined amount of adjustment of the yoke 68 may be employed. The result of using such a yoke adjustment will be manifested upon the second film after processing thereof by the film image 121 having originally horizontal lines of the photographed object centrally arched or depressed, as indicated at 122 in Fig. 8.

When such a properly drooped film image is projected onto a horizontally curved screen of suitable concave shape to function therewith from a predetermined projection position well above the screen, the depressed upper outer corner portions 124 of the image will strike side marginal portions of the screen forwardly of the center thereof while the raised upper center portion 125 of the film image will travel further rearwardly before striking the center of the screen, with the result that the introduced droop will be substantially eliminated, or seem so to a person in front of the screen.

The wheel 114 should have as little frictional resistance to rotation as possible and when desired might be made in the form of a composite wheel having disklike members 114a carried by a shaft 38 and a central concave member 114b rotatably mounted by antifriction bearing means 114c. Such antifriction bearings are desirable so that the rotational speed of the central member 114b may be different from that of the side members 114a to further reduce friction upon the film.

An additional distortion factor commonly referred to as keystone effect may also be cared for by the continuous slit printing apparatus of the present invention. This distortion is introduced into the screen image by projecting from a position above or below a normal extending forwardly from the center of the screen. In fact droop distortion and keystone distortion may result simultaneously. This keystone distortion may be eliminated by providing in the images upon the second film P a shortening of the length of the lower edge 126 of the image (see Fig. 8) relative to the horizontal center line 128 and by simultaneously lengthening the upper edge 123. As pointed out previously, proper shaping of the cam surface 92a will provide a suitable movement of the objective 66, for "pushing out" and "pulling in" different parts of the opposite side edges of each frame being copied. Thus the shape of the cam surface 92a may be made so as to push-out the upper corners and pull-in the lower corners of each frame P' proper amounts to compensate for any keystone effect encountered. Accordingly, the photographed grill of equal size squares on the film P would appear somewhat like the pattern shown at 121. When projected, however, it would appear substantially distortion free.

Figure 9:
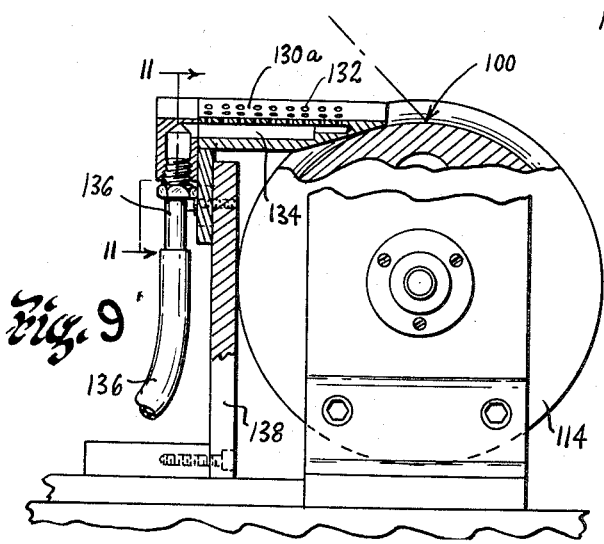
Fig. 9 is a fragmentary elevational view showing a modification of a part of the printing apparatus of Fig. 1, certain parts thereof being broken away.
Figure 11:
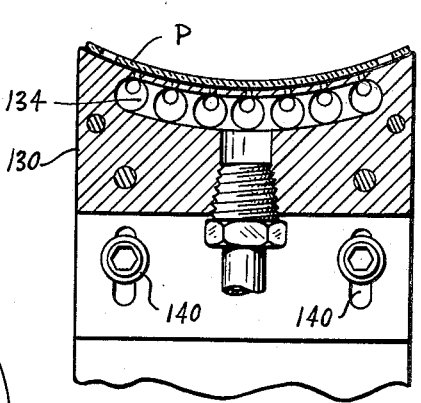
Fig. 11 is a sectional view taken substantially on section line 11—11 of Fig. 9.

It may be desirable at times to provide additional or different means for maintaining the film P in a transversely concave condition at the copying position 100 and for this purpose there is shown in Figs. 9, 10 and 11 a modified construction and arrangement employing a suction guide block 130 which has its upper surface 130a transversely cylindrically concaved and this surface is provided with a plurality of small openings 132 communicating with a vacuum chamber 134 therewithin connected with a suction line 136. This suction guide block 130 is supported by a bracket 138 secured to the base 10 and may be provided with slot and bolt adjustment means 140 to allow exact vertical positioning of the guide surface with reference to the concave surface of the wheel 114.

For best optical performance during transverse shifting of the objective 66, it may be desirable to adjust slightly the relative position between the front and back optical components of the objective, and for this purpose there is shown in Fig. 12 a modified construction wherein each component 66a and 66b is individually axially adjustable. These components are held together by a pair of tensioned springs 66c secured to the respective short tubular mounts 66d for the components, and an increase or decrease in the spacing therebetween as the objective is transversely shifted is provided by a resiliently urged plunger 144 having a conically tapered lower end 144a engaging and spacing the tubular mounts for the components and a rounded upper and 144b in engagement with a fixed cam 146 of controlled surface shape fixedly carried by the crossbar 68a. The arrangement is such that as the objective 66 is moved in one axial direction or the other from its mean position by the link 81, the rounded end 144b will be caused to ride along the surface of the cam 146, thereby forcing the conical end 144a of the plunger to move in and out relative to the tubular mounts 66d and to increase or decrease the axial spacing between the components. Coiled springs 66c tend to pull the mounts together. Thus a best focus upon the second film P may be maintained while the objective 66 is being shifted transversely for change in transverse dimensions of different parts of each film image P' being copied.

Figure 15:
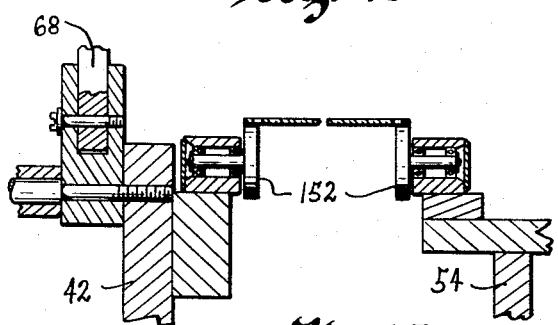
Fig. 15 is a sectional view taken substantially on line 15—15 of Fig. 14.

In Figs. 14 and 15 there is shown a modified arrangement for positioning the first film N at the illumination position 100 and this arrangement is of particular utility at times when a film of considerable transverse width is being employed. Instead of the relatively large flanged wheels 34 shown in Fig. 1 there may be employed in this modified arrangement a pair of spaced freely rotatable small diameter wheels 152 located beneath the opposite side edges of the film so that the film will be arched over the top of these rollers and the resulting curvature will maintain the illumined transverse section of the film at the illumination position accurately in focus relative to the objective 66 even though the film may be moving at considerable speed through the apparatus.

In this modification a light source 154, somewhat like that previously shown at 62, is employed but preferably this light source will be in direct alignment with the optical system carried by the yoke 68 and of a known type forming and projecting a narrow elongated streak or slit of light (preferably of a .005 inch width) onto the film and so as to extend transversely of the film at position 50. In such an arrangement a transverse slit of light will be provided at the film surface 50 for copying purposes even though no mechanical slit forming elements are actually positioned at this location. One purpose for such an arrangement is that at times when a mechanical slit of small width is positioned adjacent the continuously moving first film, dust accumulates at the slit and may cause poor copying conditions at the second film P at position 100.

While a slit or streak of light of approximately .005 of an inch in width may be preferable for most printing purposes, this width may be, under certain conditions, increased or decreased appreciably if desired. For example, the slit width may be decreased somewhat without optical difficulties but if decreased the speed of travel of the film will of necessity have to be less if proper exposure of the positive film is to be had and this speed decrease might not be a desirable condition from the economical standpoint of overall time required to print an entire film or motion picture. On the other hand the slit width may be increased somewhat without objectionable deterioration of image. Additionally, it should be noted that much greater slit widths, even as much as 1/8 inch, may be used to give greater total light flux and greater printing speed in cases wherein droop alone is the only distortion to be introduced into the image being formed.

Figure 16:
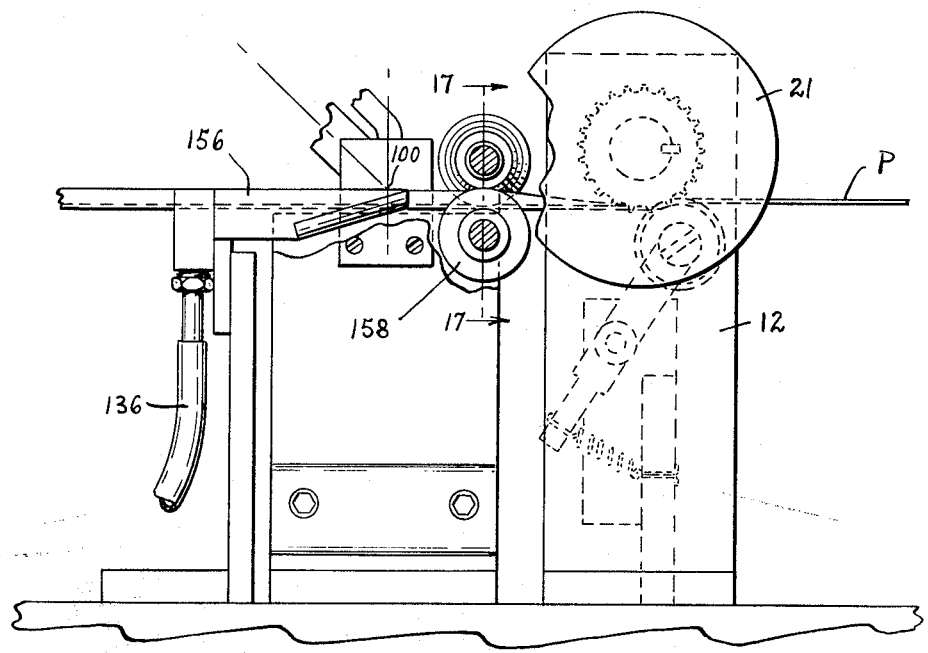
Fig. 16 is a fragmentary side elevational view showing another modification of a part of the printing apparatus of Fig. 1.
Figure 17:
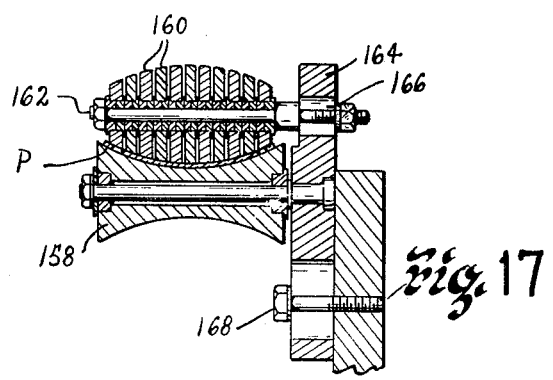
Fig. 17 is a fragmentary sectional view taken substantially upon section line 17—17 of Fig. 16.

In Figs. 16 and 17 a further modification of the apparatus of Fig. 1 is shown for concavely curving the film P substantially at the copying position 100. In this construction, a concave vacuum guide block 156, much like that shown at 130 in Fig. 9, is used but adjacent thereto and longitudinally aligned therewith is provided a small diameter concave roller 158, the transverse shape thereof being like that provided the guide block 156, for concavely supporting the film P at the copying position 100. Above the upper surface of this roller 158 is journaled a multiple roller 159 comprising a plurality of narrow disk-like elements 160 which are independently rotatable upon a positioning shaft 162. This shaft 162 is in turn vertically adjustable relative to a supporting bracket 164 and thus relative to the roller 158 by adjustment means indicated at 166. The bracket 164 is likewise vertically adjustable by means shown at 168 so that it may be properly located to best receive the concave film as same leaves the vacuum guide.

Figure 18:
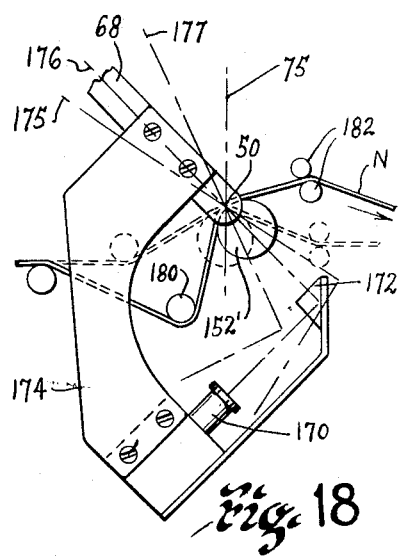
Fig. 18 is a diagrammatic sketch indicating a modified form of illuminating means for the apparatus.

In Fig. 18 there is diagrammatically indicated an illumination system 170 and prism 172 for providing a transverse slit of light at the illumination position 50. This arrangement is much like that shown in Fig. 1 except that in Fig. 1 for each different angular adjustment of the yoke 68 a different reflecting prism of proper angular value will be necessary at 60 in order to always direct light from the light source 62 to the position 50 and toward the optical system aligned therewith, while in Fig. 18 a second yoke 174 is shown fixedly attached to the side arms of the first yoke 68 for pivoting therewith about the axis through points 50 and 100 from vertical plane 75 to different positions such as 175, 176 and 177. Such different positions allow different amounts of droop to be introduced into the copied image P' and the use of the second yoke 174 carrying light source 170 and prism 172 insures that the light will always be directed properly toward the point 50 and thus toward the optical system carried by yoke 68. Of course, a swingable light source in direct alignment with the optical system on the yoke 68 (thus eliminating the need of the reflecting prism 172) could also be as readily arranged by the proper arrangement of the second yoke, if desired. In this modified arrangement the pair of film supporting rollers 152' as well as the guide rollers 180 and 182 forwardly and rearwardly, respectively, of the illumination position 50 could, if desired, be arranged (by means not shown) to tilt as the yokes 68 and 174 tilt, with the result that the slit of light at the position 50 would strike the film N more nearly normally thereof.

While the combined introduction of droop and keystone correction has been described above for theater conditions with the projection beam appreciably above or below a normal extending from the center of the screen, it is here pointed out that in cases wherein the projection beam coincides with the normal from the screen but wherein the audience position and thus line-of-sight to the screen is well above or below this normal only droop introduction will be needed, and such correction it will be appreciated is also possible by proper use of the printing apparatus of the present invention.

As stated previously, images upon the first film N may be transferred to the second film P by the apparatus of the present invention and at such times it will be possible by movement of the lens of the objective 66 to variably change the transverse dimensions of different parts of each copied frame for side edge rectification and keystone elimination and when desired the yoke 68 may be differently angularly adjusted to provide predetermined amounts of droop in the copied image according to the intended use of the finished second or released film. While such distortion introducing conditions may be provided independently it will also be appreciated from a consideration of the apparatus of the present invention that these distortions may be simultaneously introduced when desired.

While it has been previously stated that the rectification of side portions of the image may be accomplished through the use of a cam surface 92a having diametrically opposed high and low points, the cam surface 92a in order to introduce correction for errors of keystoning in successive frames (such as diagrammatically illustrated in Fig. 8) will have to be stepped and carefully shaped intermediate the stepped portion or portions in order to introduce the proper width of image at the top with the gradual decreasing of this width downwardly toward the center line and further downwardly toward the lower part thereof, the stepped portion or portions of the cam of course being operative during the intervals of film travel between successive frames thereon. It is further pointed out that the camming action by the stepped or steeply sloped portion or portions of the cam will have to be brought about rapidly since the successive frame images on the film strips follow one another (see for example frames N' in Fig. 2) in rapid succession and with very little clear space therebetween.

Figure 4:
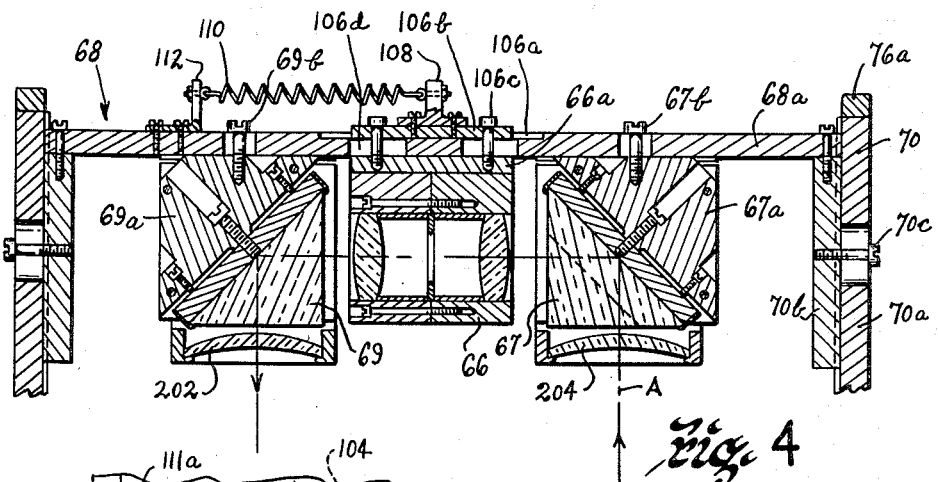
Fig. 4 is a fragmentary transverse sectional view taken substantially upon section line 4—4 of Fig. 1.

While the optical system 66 has been shown for printing to a 1 to 1 ratio, it is to be understood that the ratio of printing might be readily altered; for example, it might be arranged for a 1 to 2 or even higher ratio, or for a 2 to 1 or even lower ratio or for various ratios therebetween. This may be accomplished by shifting the initial position of the objective longitudinally along its optical axis and relative to the supporting member 68a, and it might even necessitate a change of objectives for best copying results. For example, if the images are to be reduced by a 2 to 1 ratio, the initial position of the objective 66 on the supporting member 68a would be optically closer to the film strip P. It is to be understood, however, that the basic principle and function of said objective in performing its corrective function will remain as described above, both with respect to the objective 66 as shown in Fig. 4 and with respect to the modified objective shown in Fig. 12.

Obviously, in any case wherein the magnification ratio is altered from the 1 to 1 ratio system herein disclosed, different rates of film travels will be required for the strip films N and P, respectively, and such different rates can be readily and easily accomplished in the apparatus disclosed by a proper choice of diameter ratios for the drive sprockets 18 and 20 according to the magnification ratio selected at the time the rest of the structure is being adapted for the desired change in film sizes.

Figure 19A:
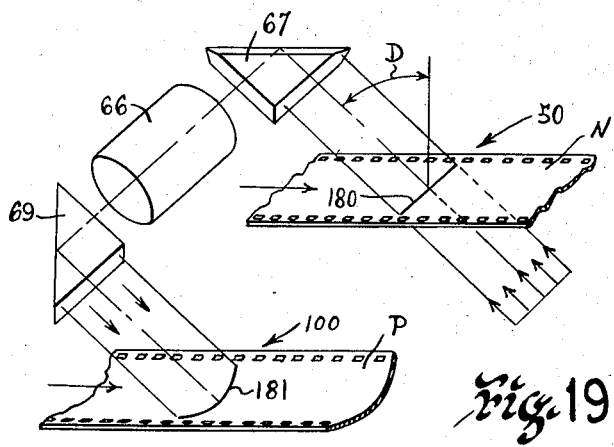
Figs. 19A and 19B are, respectively, diagrammatic showings of two different modifications for providing droop conditions in film images being printed.

While preferred constructions of printing apparatus embodying transversely concavely curved film supporting means for the second film P and transversely flat film supporting means for the first film N have already been shown and described for introducing droop into the film image being copied, it should be appreciated that droop may also be introduced by differently modified constructions and arrangements of the apparatus. In Fig. 19A there is diagrammatically shown in perspective, for example, the relationship existing between films N and P as employed in Figs. 1–6. It will be readily appreciated therefrom that while the first film N is in a transversely flat condition at the illumination position 50 (so that the streak of light impinging thereon will illuminate a straight narrow transverse portion of the film, as indicated by the solid line 180) nevertheless the image of this illuminated portion being projected by the objective 66 upon the transversely concavely curved second film P will strike this film obliquely in accordance with the angle of tilt D of the supporting yoke 68 for the objective and thus will be upon the film P at the copying position 100 curved as indicated by solid line 181.

Figure 19B:
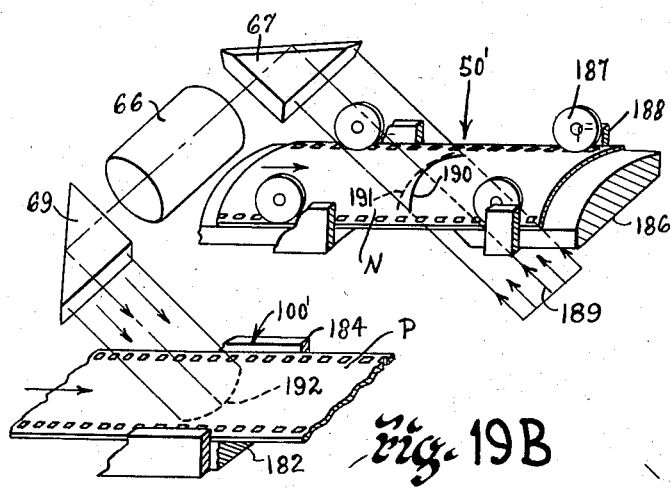

In the modified printing arrangement for introducing drop diagrammatically indicated in Fig. 19B on the other hand there is shown transversely flat film supporting means 182 and side guide means 184 for the second film P at the copying position 100'. There is provided for the first film N in this modification transversely convexly curved film supporting means 186 and pressure rollers 187 (carried by suitable means not shown) and engaging edge portions of the film between suitable side guide means 188. These film guiding and supporting means will be disposed closely adjacent the illumination position 50' but sufficient space, of course, will be provided at the position 50' for the passage of a narrow transverse beam of light as indicated by arrows 189 for illuminating the film N. In much the same manner various amounts of droop may be introduced by such a modified arrangement by the use of different predetermined amounts of tilt provided the optical system by adjustment of the previously described inverted U-shaped yoke 68 supporting said optical system.

From the description which follows it is believed that the introduction of droop by this modified arrangement will be readily appreciated. If a straight narrow transverse streak of light is directed obliquely towards the film N at illumination position 50', because of the transversely curved convex shape of the film the lighted portion of the film N will have a curved shape as indicated by solid line 190. (Note that this lighted portion lies entirely in a single obliquely disposed plane.) For convenience in describing the operation of the structure let it be assumed that a transversely extending straight dotted line 191 is present in the picture upon the moving film to be copied and is approaching the illumination position 50'. This dotted line 191 will, of course, be bent downwardly at its outer edges because of the transversely bent condition of the film. Accordingly, even though normally straight line 191 is, at this time curved, all points thereon will lie in a single vertical transverse plane. However, the central part of dotted line 191 as it moves forward will reach the illumination beam at 50' first and an image of this part only of the dotted line 191 will be transmitted to the simultaneously moving film P. Accordingly, this part of the dotted line 191 will be recorded upon the film P at 192. As film N progresses, parts of the dotted line 191 further from the center of the film will be successively illuminated and accordingly copied onto film P. Finally the outer edges of the dotted line 191 will be illuminated and thereupon copied upon film P to thereby complete dotted line image 192. It will be clear therefore that travel of the film P during copying cooperates with the convexly curved condition of the film N in bringing about a droop condition in dotted line 192 in the modified construction of Fig. 19B as well, even though the original dotted line 191 was a straight transverse line.

Obviously all transverse portions of each picture on film N being copied would likewise be drooped.

In the modifications of both Figs. 19A and 19B, however, the transversely illuminated portion of the film N will be properly focused by the objective 66 as narrow transverse streaks of light upon the second film P due to the inherent curvature of field of the selected objective. It follows furthermore from these two modified constructions that various different conditions of curvature in either film (N or P) and a corresponding modified curvature in the other film (P or N) will likewise provide means for introducing droop conditions into the film image being formed and in accordance with the particular amount of tilt of the yoke 68 being employed. Obviously other film supporting and guiding means for maintaining the transverse shape of either film at positions 50' or 100' may be employed.

Figure 20:
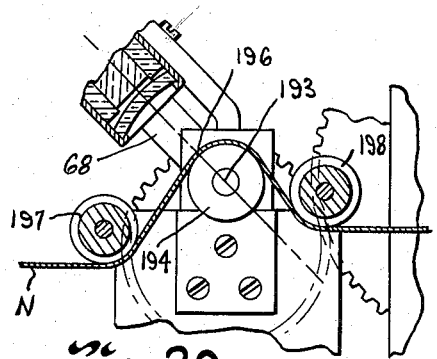
Fig. 20 is a view similar to Fig. 14 but showing a slight modification of the structure thereof.

It may be desirable under certain printing conditions to have the beam of light illuminating the first film N pass more nearly normally therethrough instead of obliquely as shown in Fig. 14. Accordingly there is shown in Fig. 20 a modification wherein an axis 193 for a pair of supporting rollers 194 for the film N is arranged at a location corresponding to that occupied by the illuminated part of the film at the copying location 50 in Fig. 14. This would mean, in other words, that the axis 193 instead of point 50 would be in fact in substantial axial alignment with the pivotal axis of the pivot pins 74 for the swingable U-shaped yoke 68 carrying the optical system including objective 66. Therefore, regardless of the particular size of the rollers 194 being used, the peripheral points thereon at which the illuminated portion of the film is located (for example location 196 in Fig. 20) will always hold the illuminated part of the film substantially normal to the optical axis of the objective 66 as well as normal to the illumination beam impinging thereon. Furthermore this normal condition will always be maintained for all angles of tilt provided the swingable yoke 68 to accommodate various different conventional theater projection conditions. Of course guide rollers 197 and 198 forwardly and rearwardly, respectively, of the supporting rollers 194 will be so positioned relative to rollers 194 as to wrap the film N sufficiently about the rollers 194 at and near the illumination position 196 to insure at all times and for all conditions of adjustment of the yoke 68 a firm stable in-focus supporting condition for the film N. When an illumination arrangement like that at 196 in Fig. 20 (or that at 50 in Fig. 18) is being used and the objective 66 is thereafter directing light from film N obliquely onto the film P at copying position 100, it is desirable to have the width of the streak of light at 196 (or at 50 in Fig. 18) as narrow as conveniently possible in order to obtain best image definition. This is because of the dissimilar widths of the oblique light at 100 and the normal light at 196 (or at 50 in Fig. 18).

While preceding parts of the disclosure have referred to the lens system 66 as a copying objective having a preselected amount of curvature of field for the printing apparatus disclosed herein, it should be appreciated that in cases where the finest possible copying results are desired an additional lens or lenses for providing even more exact curvature of field to fit the transversely curved and flat conditions of the films N and P may be employed. In Fig. 4 such additional or auxiliary lens elements are indicated at 202 and 204, respectively, and may be considered as parts of a well corrected objective. In Fig. 5 it will be seen that the lens element 204 is carried by mounting means 206 engaging the outer sides of a pair of supporting plates 78a and 78b secured in turn to the prism supporting blocks 67a. The lens 204 and its mounting means 206 may be adjusted axially toward or away from the copying position 50 by use of slot and screw means 208 and 209 (see Fig. 2).

Of course, other forms of lens systems particularly adapted and arranged for copying purposes and highly corrected for color and other aberrations might readily be employed in place of the system disclosed in Fig. 4 as long as sufficient space is provided to accommodate the axial movement of the objective or parts thereof during side edge rectification and keystone for compensation of the image being copied.

Figure 8:
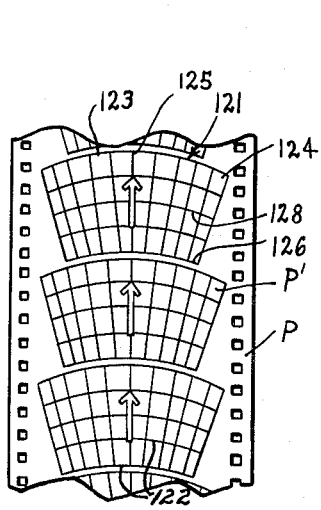
Fig. 8 is a view of a portion of strip film containing film images having side edge rectification, keystone correction and droop present therein.
Figure 21:
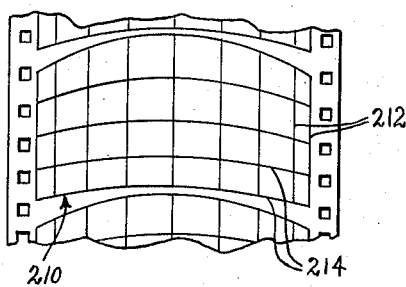
Fig. 21 is a view of a portion of positive strip film having printed thereon a film image containing side edge rectification and droop but without having any keystone compensation present therein.

In Fig. 21 there is shown a film image 210 somewhat like that presented by Fig. 8 but in which case side edge rectification has been provided therein as indicated by straight lines 212 as well as droop compensation as indicated by curved transverse lines 214, but it will be noted no keystone correction or compensation has been provided therein. While probably such a modified film image would be less often desired during use of the apparatus of the present invention, nevertheless, such a film image might be needed in certain cases and could be provided by the disclosed apparatus by merely providing the control cam 92 with a cam surface of proper shape. A condition requiring the film image 210 corrected only in this manner might be a case wherein the curved viewing screen for receiving the projected image was arranged to more nearly directly face the projection booth while persons situated in the audience to view the projected image would be disposed at a location well above or well below the projection axis extended from the projector to the center of the screen.

Having described our invention, we claim:

1. Projection printing apparatus comprising a first film-actuating means for moving an image carrying strip film past an illumination position in said apparatus, a second film-actuating means for moving a sensitized strip film past a copying position in said apparatus, driving means operatively connected to said first and second film-actuating means so as to cause continuous simultaneous movement of both films during exposure of said sensitized film, an optical system optically aligned with said illumination and copying positions, and including an objective for forming an image of information on said first-mentioned strip film at said illumination position upon said second-mentioned strip film at said copying position, film illuminating means including a light source for illuminating said first strip film at said illumination position in such a manner that only a narrow elongated transverse area thereof will transmit light rays to said objective, film supporting means for maintaining moving portions of said first and second films in operative positions at said illumination and copying positions, respectively, said film supporting means being of such transverse shapes and so positioned as to support said portions of said films at said illumination and copying positions during simultaneous movement thereof, so that said portions will be in conjugate relation to each other, and with at least one of said shapes being of a controlled transverse curvature, and means for angularly positioning said optical system relative to the direction of travel of the transversely curved portion of said one film so that the optical axis of said system will intersect said last mentioned portion substantially at a given acute angle, whereby light rays coming from said narrow elongated transverse area of said first film and transmitted by said objective will form upon said second film during movement thereof a film image which has side portions thereof progressively longitudinally displaced relative to the central portion thereof so as to compensate at least to a material degree for the droop distortion that would otherwise appear in the image when projected in a given inclined manner onto a given horizontally curved viewing screen.

2. Projection printing apparatus comprising a first film-actuating means for moving an image carrying strip film past an illumination position in said apparatus, a second film-actuating means for moving a sensitized strip film past a copying position in said apparatus, driving means operatively connected to said first and second film-actuating means so as to cause continuous simultaneous movement of both films during exposure of said sensitized film an optical system optically aligned with said illumination and copying positions, and including an objective for forming an image of information on said first-mentioned strip film at said illumination position upon said second-mentioned strip film at said copying position, film illuminating means including a light source for illuminating said first strip film at said illumination position in such a manner that only a narrow elongated transverse area thereof will transmit light rays to said objective, means for maintaining the moving portion of said first film traversing said illumination position in an operative position, and means for maintaining the moving portion of said second strip film traversing said copying position in a transversely curved shape in conjugate relation to the moving portion of said first film at said illumination position, and means for angularly positioning said optical system relative to the direction of travel of said second film at said copying position so that the optical axis of said system will intersect said second film substantially at a given angle of less than ninety degrees relative to said direction of travel thereof, whereby light rays coming from said narrow elongated transverse area of said first film and transmitted by said objective will form upon said second film during movement thereof a film image which has side portions thereof progressively longitudinally displaced relative to the central portion thereof so as to compensate at least to a material degree for the droop distortion that would otherwise appear in the image when projected in a given inclined manner onto a given horizontally curved viewing screen.

3. Projection printing apparatus comprising a first film-actuating means for moving an image carrying strip film past an illumination position in said apparatus, a second film-actuating means for moving a sensitized strip film past a copying position in said apparatus, driving means operatively connected to said first and second film-actuating means so as to cause continuous simultaneous movement of both films during exposure of said sensitized film, an optical system optically aligned with said illumination and copying positions, and including an objective for forming an image of information on said first-mentioned strip film at said illumination position upon said second-mentioned strip film at said copying position, film illuminating means including a light source for illuminating said first strip film at said illumination position in such a manner that only a narrow elongated transverse area thereof will transmit light rays to said objective, means for maintaining the moving portion of said first strip film traversing said illumination position in a given transversely curved shape, and means for maintaining the moving portion of said second film traversing said copying position in an operative position in conjugate relation to said moving portion of said first film, and means for angularly positioning said optical system relative to the direction of travel of said first film at said illumination position so that the optical axis of said system will intersect said first film substantially at a given acute angle, whereby light rays coming from said narrow elongated transverse area of said first film and transmitted by said objective will form upon said second film during movement thereof a film image which has side portions thereof progressively longitudinally displaced relative to the central portion thereof so as to compensate at least to a material degree for the droop distortion that would otherwise appear in the image when projected in a given inclined manner onto a given horizontally curved viewing screen.

4. Projection printing apparatus comprising a first film-actuating means for moving an image-carrying strip film past an illumination position in said apparatus, a second film-actuating means for moving a sensitized strip film past a copying position in said apparatus, driving means operatively connected to said first and second film-actuating means so as to cause continuous simultaneous movement of both films during exposure of said sensitized film, an optical system optically aligned with said illumination and copying positions, and including an objective for forming an image of information on said first-mentioned strip film at said illumination position upon said second-mentioned strip film at said copying position, film illuminating means including a light source for illuminating said first strip film at said illumination position in such a manner that only a narrow elongated transverse area thereof will transmit light rays to said objective, means for maintaining the moving portion of said first film traversing said illumination position in an operative position, and means for maintaining the moving portion of said second strip film traversing said copying position in a given transversely curved shape in conjugate relation to the moving portion of said first film at said illumination position, said last mentioned means comprising a guide shoe of a width sufficient to accommodate said sensitized film and of a given concave cylindrical curvature so as to provide in said film said transversely curved shape, and means for angularly positioning said optical system relative to the direction of travel of said second film at said copying position so that the optical axis of said system will intersect said second film substantially at a given angle of less than ninety degrees relative to said direction of travel thereof, whereby light rays coming from said narrow elongated transverse area of said first film and transmitted by said objective will form upon said second film during movement thereof a film image which has side portions thereof progressively longitudinally displaced relative to the central portion thereof so as to compensate at least to a material degree for the droop distortion that would otherwise appear in the image when projected in a given inclined manner onto a given horizontally curved viewing screen.

5. Projection printing apparatus comprising a first film-actuating means for moving an image-carrying strip film past an illumination position in said apparatus, a second film-actuating means for moving a sensitized strip film past a copying position in said apparatus, driving means operatively connected to said first and second film-actuating means so as to cause continuous simultaneous movement of both films during exposure of said sensitized film, an optical system optically aligned with said illumination and copying positions, and including an objective for forming an image of information on said first-mentioned strip film at said illumination position upon said second-mentioned strip film at said copying position, film illuminating means including a light source for illuminating said first strip film at said illumination position in such a manner that only a narrow elongated transverse area thereof will transmit light rays to said objective, means for maintaining the moving portion of said first film traversing said illumination position in an operative position, and means for maintaining the moving portion of said second strip film traversing said copying position in a given transversely curved shape in conjugate relation to the moving portion of said first film at said illumination position, said last-mentioned means comprising a relatively large rotatable wheel-like member having its peripheral surface of a width sufficient to accommodate said sensitized film and of a given concaved curvature so as to provide in the moving portion of said second film said transversely curved shape, and means for angularly positioning said optical system relative to the direction of travel of said second film at said copying position so that the optical axis of said system will intersect said second film substantially at a given angle of less than ninety degrees relative to said direction of travel thereof, whereby light rays coming from said narrow elongated transverse area of said first film and transmitted by said objective will form upon said second film during movement thereof a film image which has side portions thereof progressively longitudinally displaced relative to the central portion thereof so as to compensate at least to a material degree for the droop distortion that would otherwise appear in the image when projected in a given inclined manner onto a given horizontally curved viewing screen.

6. Projection printing apparatus comprising a first film-actuating means for moving an image-carrying strip film past an illumination position in said apparatus, a second film-actuating means for moving a sensitized strip film past a copying position in said apparatus, driving means operatively connected to said first and second film-actuating means so as to cause continuous simultaneous movement of both films during exposure of said sensitized film, an optical system optically aligned with said illumination and copying positions, and including an objective for forming an image of information on said first-mentioned strip film at said illumination position upon said second-mentioned strip film at said copying position, film illuminating means including a light source for illuminating said first strip film at said illumination position in such a manner that only a narrow elongated transverse area thereof will transmit light rays to said objective, means for maintaining the moving portion of said first film traversing said illumination position in an operative position, and means for maintaining the moving portion of said second strip film traversing said copying position in a given transversely curved shape in conjugate relation to the moving portion of said first film at said illumination position, said last-mentioned means comprising a hollow housing having a film guiding and shaping surface formed by a wall thereof, said wall having a plurality of small suction openings extending therethrough, a suction line communicating with said housing, said wall having a given transversely concaved cylindrical curvature and being of sufficient width to support and retain said sensitized film at said copying position in said transversely curved shape, and means for angularly positioning said optical system relative to the direction of travel of said second film at said copying position so that the optical axis of said system will intersect said second film substantially at a given angle of less than ninety degrees relative to said direction of travel thereof, whereby light rays coming from said narrow elongated transverse area of said first film and transmitted by said objective will form upon said second film during movement thereof a film image which has side portions thereof progressively longitudinally displaced relative to the central portion thereof so as to compensate at least to a material degree for the droop distortion that would otherwise appear in the image when projected in a given inclined manner onto a given horizontally curved viewing screen.

7. Projection printing apparatus comprising a first film-actuating means for moving an image-carrying strip film past an illumination position in said apparatus, a second film-actuating means for moving a sensitized strip film past a copying position in said apparatus, driving means operatively connected to said first and second film-actuating means so as to cause continuous simultaneous movement of both films during exposure of said sensitized film, an optical system optically aligned with said illumination and copying positions, and including an objective for forming an image of information on said first-mentioned strip film at said illumination position upon said second-mentioned strip film at said copying position, film illuminating means including a light source for illuminating said first strip film at said illumination position in such a manner that only a narrow elongated transverse area thereof will transmit light rays to said objective, means for maintaining the portion of said second strip film traversing said copying position in a given transversely curved shape in conjugate relation to the transverse area of said first film at said illumination position, said last-mentioned means comprising a hollow housing and a supporting roller in adjacent relation, said housing having a film guiding and shaping surface formed by a wall thereof, a plurality of small suction openings extending through said wall, a suction line communicating with said housing, said wall and said supporting roller having similar predetermined concaved transverse curvatures so as to jointly provide in said sensitized film at said copying position said transversely curved shape, and means for angularly positioning said optical system relative to the direction of travel of said second film at said copying position so that the optical axis of said system will intersect said second film substantially at a given angle of less than ninety degrees relative to said direction of travel thereof, whereby light rays coming from said narrow elongated transverse area of said first film and transmitted by said objective will form upon said second film during movement thereof a film image which has side portions thereof progressively longitudinally displaced relative to the central portion thereof so as to compensate at least to a material degree for the droop distortion that would otherwise appear in the image when projected in a given inclined manner onto a given horizontally curved viewing screen.

8. Projection printing apparatus of the character described comprising a first film-actuating means for moving an image-carrying strip film past a predetermined illumination position in said apparatus, a second film-actuating means for moving a sensitized strip film past a predetermined copying position in said apparatus, driving means operatively connected to said first and second film-actuating means so as to cause continuous simultaneous movement of both films during exposure of said sensitized film, an optical system optically aligned with said illumination and copying positions, and including an objective for forming an image of information on said first mentioned strip film at said illumination position upon said second mentioned strip film at said copying position, film illuminating means including a light source for illuminating said first strip film at said illumination position in such a manner that only a narrow elongated transverse slit-like portion will transmit light rays to said objective, means for maintaining the portion of said second strip film traversing said copying position in a predetermined transversely curved shape, means for positioning said optical system so that its optical axis is disposed at a predetermined acute angle relative to the direction of travel of said second film at said copying position, means mounting said objective for movement along its optical axis, magnification control means operatively connected to said objective and to said driving means and arranged to axially move said objective back and forth through a predetermined operating cycle each time a predetermined unit of travel of said strip films at said illumination and copying positions occurs, whereby light rays coming from said narrow elongated tranverse slit-like portion of said first film and transmitted by said objective during travel of said first film will form upon the simultaneously moving second film a narrow elongated transverse image having predetermined curvature and a length of controlled varying magnitude at different parts of each unit of film travel thereof.

9. Projection printing apparatus of the character described comprising a first film-actuating means for moving an image-carrying strip film past a predetermined illumination position in said apparatus, a second film-actuating means for moving a sensitized strip film past a predetermined copying position in said apparatus, driving means operatively connected to said first and second film-actuating means so as to cause continuous simultaneous movement of both films during exposure of said sensitized film, an optical system optically aligned with said illumination and copying positions, and including an objective for forming an image of information on said first mentioned strip film at said illumination position upon said second mentioned strip film at said copying position, film illuminating means including a light source for illuminating said first strip film at said illumination position in such a manner that only a narrow elongated tranverse slit-like portion thereof will transmit light rays to said objective, means for maintaining the portion of said second strip film traversing said copying position in a predetermined transversely curved shape, means for positioning said optical system so that its optical axis is disposed at a predetermined acute angle relative to the direction of travel of said second film at said copying position, means mounting said objective for movement along its optical axis, magnification control means operatively connected to said objective and to said driving means and including a cam surface of controlled contour arranged to axially move said objective so as to provide a decrease in image magnification as a preselected part of a unit length of said second film traverses said copying position and an increase in image magnification as a different preselected part of said unit length traverses said copying position, whereby light rays coming from said narrow elongated transverse slit-like portion of said first film and transmitted by said objective during simultaneous travel of said first and second films and movement of said objective will form upon a unit length of said second film a picture image of said information having controlled amounts of longitudinal displacement between the side edges thereof as well as controlled amounts of displacement of upper and lower side edge portions thereof in a transverse direction.

10. Projection printing apparatus of the character described comprising a first film-actuating means for moving an image-carrying strip film past a predetermined illumination position in said apparatus, a second film-actuating means for moving a sensitized strip film past a predetermined copying position in said apparatus, driving means operatively connected to said first and second film-actuating means so as to cause continuous simultaneous movement of both films during exposure of said sensitized film, an optical system optically aligned with said illumination and copying positions, and including an objective for forming an image of information on said first mentioned strip film at said illumination position upon said second mentioned strip film at said copying position, film illuminating means including a light source for illuminating said first strip film at said illumination position, and in such a manner that only a narrow elongated transverse slit-like portion thereof will transmit light rays to said objective, means for maintaining the portion of said second strip film traversing said copying position in a predetermined transversely curved shape, means for positioning said optical system so that its optical axis is disposed at a predetermined acute angle relative to the direction of travel of said second film at said copying position, means mounting said objective for movement along its optical axis, magnification control means operatively connected to said objective and to said driving means and including a cam surface of controlled contour arranged to axially move said objective so as to provide controlled changes in image magnification as a unit length of said second film traverses said copying position, whereby light rays coming from said narrow elongated transverse slit-like portion of said first film and transmitted by said objective during simultaneous travel of said first and second films and movement of said objective will form upon a unit length of said second film a picture image of said information having controlled amounts of longitudinal displacement intermediate the side edges thereof and controlled amounts of transverse displacement of side edge portions thereof for compensating for picture image sag and keystone effect when same is subsequently projected at a predetermined projection angle onto a curved viewing screen.

11. Projection printing apparatus of the character described comprising a first film-actuating means for moving an image-carrying strip film past a predetermined illumination position in said apparatus, a second film-actuating means for moving a sensitized strip film past a predetermined copying position in said apparatus, driving means operatively connected to said first and second film-actuating means so as to cause continuous simultaneous movement of both films during exposure of said sensitized film, an optical system optically aligned with said illumination and copying positions, and including an objective for forming an image of information on said first mentioned strip film at said illumination position upon said second mentioned strip film at said copying position, film illuminating means including a light source for illuminating said first strip film at said illumination position, and in such a manner that only a narrow elongated transverse slit-like portion thereof will transmit light rays to said objective, means for maintaining the portion of said second strip film traversing said copying position in a predetermined transversely curved shape, means for positioning said optical system so that its optical axis is disposed at a predetermined acute angle relative to the direction of travel of said second film at said copying position, means mounting said objective for movement along its optical axis, magnification control means operatively connected to said objective and to said driving means and including a cam surface of controlled contour arranged to variably axially move said objective first in one direction to cause an increase in magnification and then in the opposite direction to cause a decrease in magnification each time a predetermined unit length of said second film traverses said copying position, whereby light rays coming from said tranverse slit-like portion of said first film and transmitted by said objective during simultaneous travel of said first and second films and movement of said objective will form upon each succesive unit length of said second film picture images of said information each having controlled amounts of longitudinal displacement intermediate the side edges thereof and controlled amounts of transverse displacement of side edge portion thereof for compensating for picture image sag and keystone effect as well as effecting a straightening of said side edges when the picture image is subsequently projected at a predetermined projection angle onto a viewing screen of controlled curvature.

12. Projection printing apparatus of the character described comprising a first film-actuating means for moving an image-carrying strip film past a predetermined illumination position in said apparatus, a second film-actuating means for moving a sensitized strip film past a predetermined copying position in said apparatus, driving means operatively connected to said first and second film-actuating means so as to cause continuous simultaneous movement of both films during exposure of said sensitized film, an optical system optically aligned with said illumination and copying positions, and including an objective for forming an image of information on said first mentioned strip film at said illumination position upon said second mentioned strip film at said copying position, film illuminating means including a light source for illuminating said first strip film at said illumination position in such a manner that only a narrow elongated transverse slit-like portion thereof will transmit light rays to said objective, means for maintaining the portion of said second strip film traversing said copying position in a proper location, means for positioning said optical system so that its optical axis intersects said first and second films at said illumination and copying positions respectively, means mounting said objective for back and forth movement along its optical axis, magnification control means operatively connected to said objective and to said driving means and including a cam surface of controlled contour arranged to variably axially move said objective so as to provide changes in image magnification as different parts of a predetermined unit length of said second film traverses said copying position, whereby light rays coming from said transverse slit-like portion of said first film and transmitted by said objective during simultaneously travel of said first and second films and movement of said objective will form upon each successive unit length of said second film a picture image of said information with different transverse portions thereof having controlled amounts of image magnification so as to cause transverse displacement of upper and lower side edge portions thereof.

13. The combination set forth in claim 12 including focus control means operatively connected to said objective and responsive to movement of said magnification control means for maintaining said objective substantially at best focus during changes in magnification of the image being produced thereby.

14. Projection printing apparatus constructed and arranged to provide a controlled amount of droop-compensating distortion in a film image being formed thereby, and with said compensating distortion being controlled in accordance with the given horizontal curvature of the viewing screen to be used with said film and in accordance with the inclination of the projection axis relative to said screen so as to give upon the viewing screen an image which will appear from an associated audience area to be well corrected for droop distortion, said apparatus comprising film-actuating means for simultaneously and continuously moving a first strip film and a second strip film through an illumination station and a copying station of said apparatus respectively, means illuminating said film at said illumination station, image-forming and transfer means optically positioned intermediate said stations and arranged with the optical axis thereof at said copying station acuately angled relative to the direction of travel of said second film at said copying station, said illuminating means and said image-forming and transfer means jointly serving to form a narrow slit-like image of a transverse illuminated section of said continuously moving first film upon a transverse section of said continuously moving second film at said copying station, and means for maintaining said continuously moving second film at said copying station in a given transversely curved shape so that said narrow transverse slit-like image at said copying station will impinge acuately upon said second film and form an arcuately curved image of given transverse curvature, whereby longitudinal displacements of controlled amounts will be provided in side portions of the film image being formed on said second film relative to the central portion thereof during travel and exposure of said second film.

15. Projection printing apparatus constructed and arranged to provide a controlled amount of droop-compensating distortion in a film image being formed thereby, and with said compensating distortion being controlled in accordance with the given horizontal curvature of the viewing screen to be used with said film and in accordance with the inclination of the projection axis relative to said screen so as to give upon the viewing screen an image which will appear from an associated audience area to be well corrected for droop distortion, said apparatus comprising film-actuating means for simultaneously and continuously moving a first strip film and a second strip film through an illumination station and a copying station of said apparatus respectively, means illuminating said film at said illumination station, image-forming and transfer means optically positioned intermediate said stations and arranged with the optical axis thereof at said illumination station acutely angled relative to the direction of travel of said first film at said illumination station, said illuminating means and said image-forming and transfer means jontly serving to form a narrow slit-like image of a transverse illuminated section of said continuously moving first film upon a transverse section of said continuously moving second film at said copying station, and means for maintaining said continuously moving first film at said illumination station in a given transversely curved shape so that said narrow transverse slit-like image thereof at said copying station will impinge acutely thereon upon said second film and form an arcuately curved image of given transverse curvature, whereby longitudinal displacements of controlled amounts will be provided in side portions of the film image being formed on said second film relative to the central portion thereof during travel and exposure of said second film.

16. Projection printing apparatus constructed and arranged to provide a controlled amount of droop-compensating distortion in a film image being formed thereby, and with said compensating distortion being controlled in accordance with the given horizontal curvature of the viewing screen to be used with said film and in accordance with the inclination of the projection axis relative to said screen so as to give upon the viewing screen an image which will appear from an associated audience area to be well corrected for droop distortion, said apparatus comprising film-actuating means for simultaneously and continuously moving a first strip film and a second strip film through an illumination station and a copying station of said apparatus respectively, means illuminating said film at said illumination station, image-forming and transfer means optically positioned intermediate said stations and arranged with the optical axis thereof at one of said stations acutely angled relative to the direction of travel of the film at said one station, said illuminating means and said image-forming and transfer means jointly serving to form a narrow slit-like image of a transverse illuminated section of said continuously moving first film upon a transverse section of said continuously moving second film at said copying station, and means for maintaining said continuously moving first and second films at said illumination and copying stations respectively in given transversely curved shapes so that said narrow transverse slit-like image at said copying station will impinge acutely thereon upon said second film and form an arcuately curved image of given transverse curvature, whereby longitudinal displacements of controlled amounts will be provided in side portions of the film image being formed on said second film relative to the central portion thereof during travel and exposure of said second film.

References Cited in the file of this patent

UNITED STATES PATENTS

| Number | Name | Date |
|---|---|---|
| 1,082,678 | Casler | Dec. 30, 1913 |
| 1,528,021 | Janzer | Mar. 3, 1925 |
| 1,651,574 | Beechlyn | Dec. 6, 1927 |
| 1,801,450 | Owens | Apr. 21, 1931 |
| 1,853,072 | Morioka | Apr. 12, 1932 |
| 1,912,661 | Seymour | June 6, 1933 |
| 1,964,834 | Thun | July 3, 1934 |
| 2,299,682 | Conant | Oct. 20, 1942 |
| 2,650,517 | Falk | Sept. 1, 1953 |